United States Patent [19]

Shikano

[11] Patent Number: 5,689,401
[45] Date of Patent: Nov. 18, 1997

[54] DISK DRIVE APPARATUS HAVING DUAL I/O CONNECTORS

[75] Inventor: Kazunori Shikano, Higashine, Japan

[73] Assignee: Fujitsu Limited, Kawasaki, Japan

[21] Appl. No.: 493,707

[22] Filed: Jun. 22, 1995

[30] Foreign Application Priority Data

Oct. 24, 1994 [JP] Japan .................. 6-258567

[51] Int. Cl.$^6$ .................. G06F 1/16; H05K 7/04
[52] U.S. Cl. .................. 361/685; 439/76.1
[58] Field of Search .................. 361/684, 685, 361/686, 736, 748, 752, 760; 439/76.1, 76.2, 79, 62, 65; 364/708.1; 360/97.01, 99.12, 133, 135, 900; G06F 1/16

[56] References Cited

U.S. PATENT DOCUMENTS

| | | | |
|---|---|---|---|
| 4,767,338 | 8/1988 | Dennis et al. | 439/76.1 |
| 4,995,825 | 2/1991 | Korsunsky et al. | 439/62 |
| 5,004,207 | 4/1991 | Ishikawa et al. | 361/685 |
| 5,168,428 | 12/1992 | Suzuki | 439/76.1 |
| 5,214,572 | 5/1993 | Cosimano et al. | 439/62 |
| 5,274,645 | 12/1993 | Idleman et al. | |
| 5,364,280 | 11/1994 | Colleran | 439/76.1 |
| 5,406,450 | 4/1995 | Shieh | 361/686 |

*Primary Examiner*—Leo P. Picard
*Assistant Examiner*—Lynn D. Field
*Attorney, Agent, or Firm*—Greer, Burns & Crain, LTD

[57] ABSTRACT

A storage apparatus such as a magnetic disk drive or an optical disk drive having dual I/O ports is disclosed. The storage apparatus has a connector mounting structure which reduces the number of parts and produces a cost savings. When used in a disk drive, the storage apparatus incudes a disk enclosure, a printed circuit board arranged on the bottom surface of the disk enclosure, and connectors mounted on the printed circuit board. One end of the printed circuit board is extended to project from the disk enclosure and the connectors are mounted on the surface of the projecting portion of the printed circuit board so that the connecting direction of the connectors orthogonally crosses the plane of the printed circuit board.

9 Claims, 9 Drawing Sheets

FIG. 1A
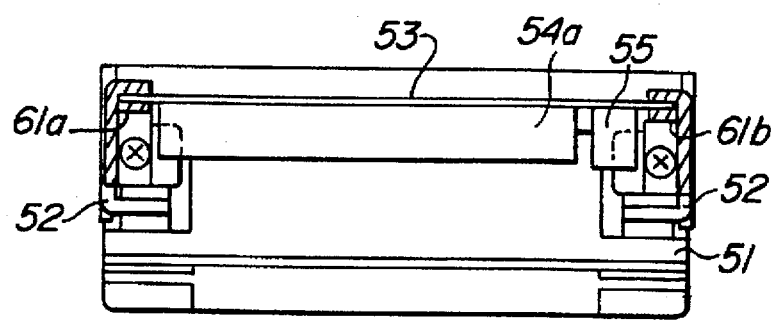
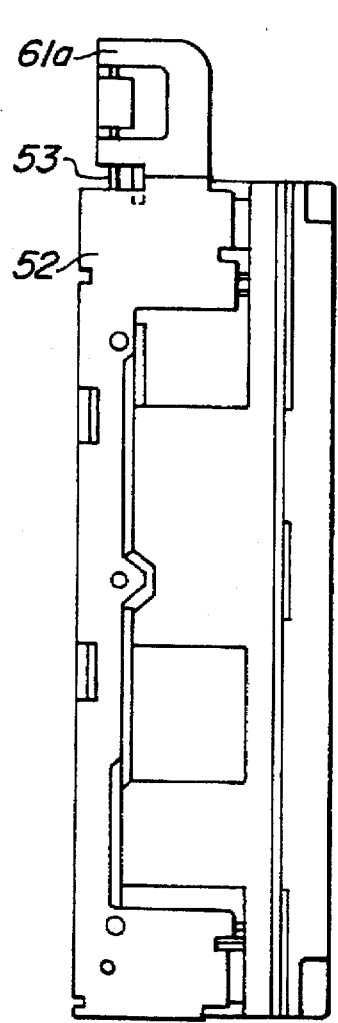
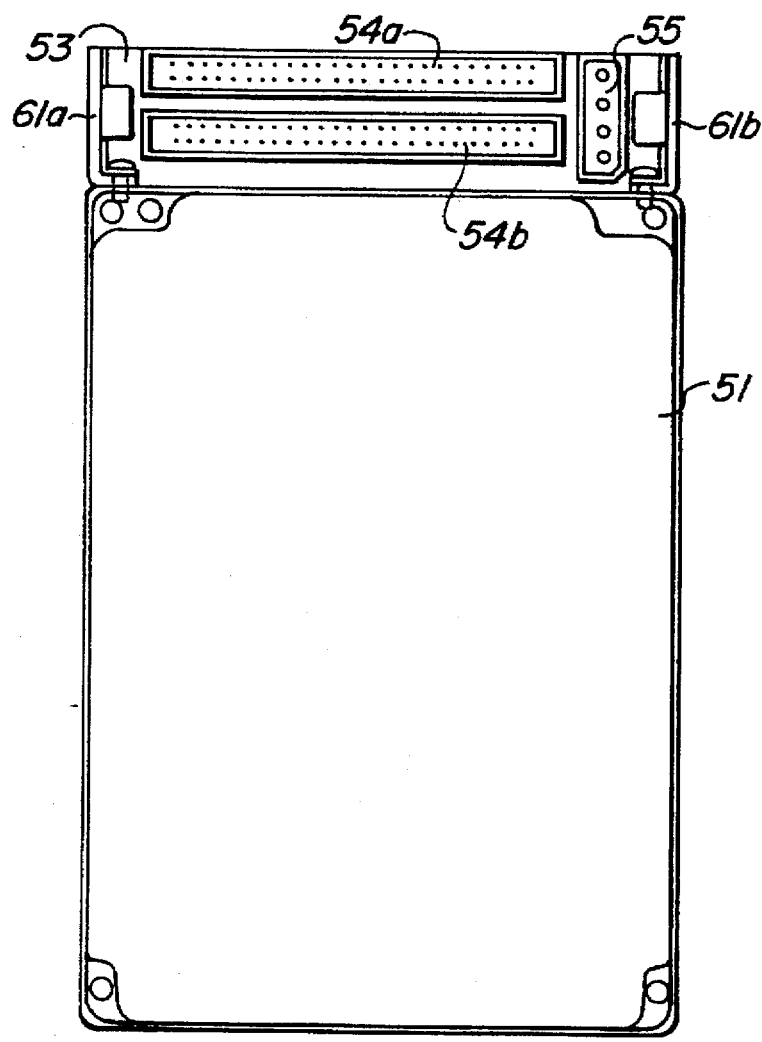
FIG. 1C
FIG. 1B

FIG. 6A
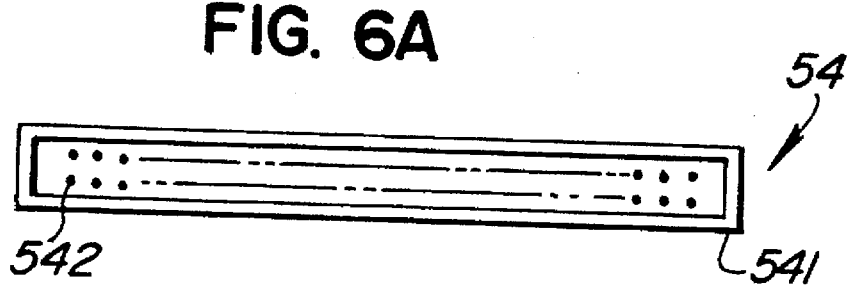
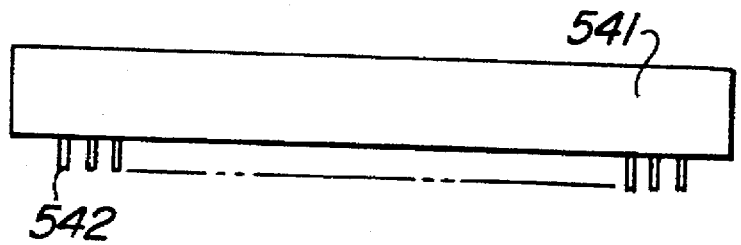
FIG. 6B
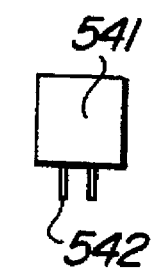
FIG. 6C
FIG. 6D
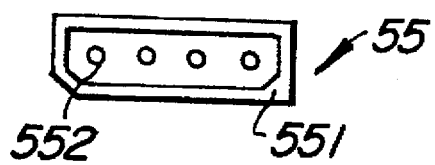
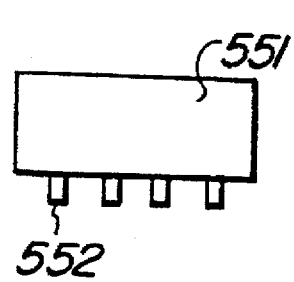
FIG. 6E
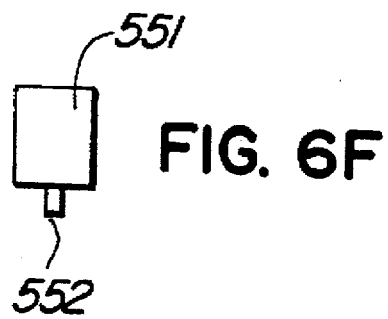
FIG. 6F

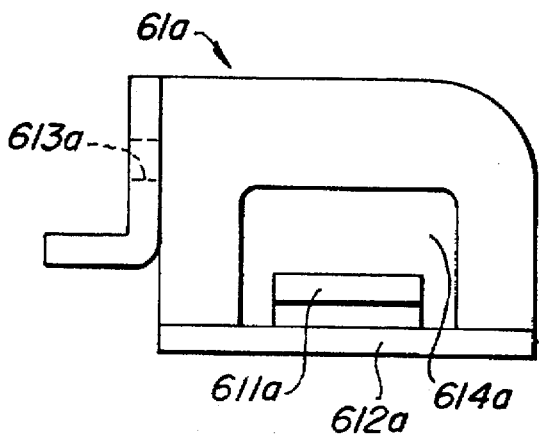
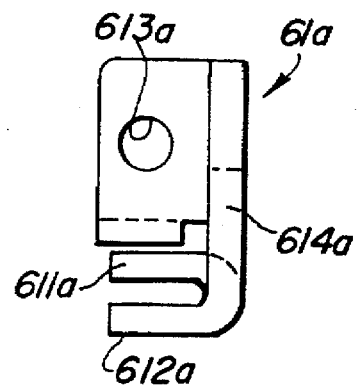
FIG. 7A    FIG. 7B
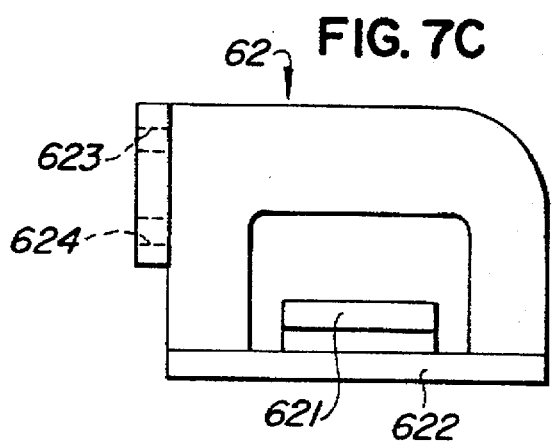
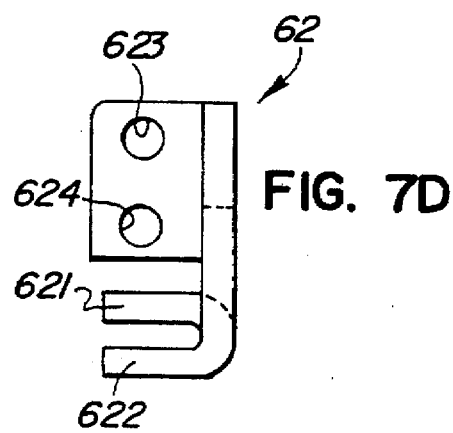
FIG. 7C    FIG. 7D
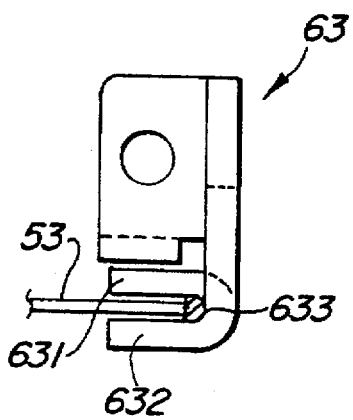
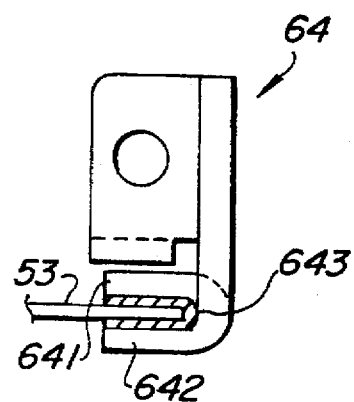
FIG. 8A    FIG. 8B

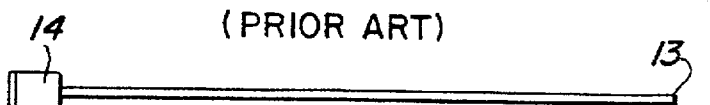
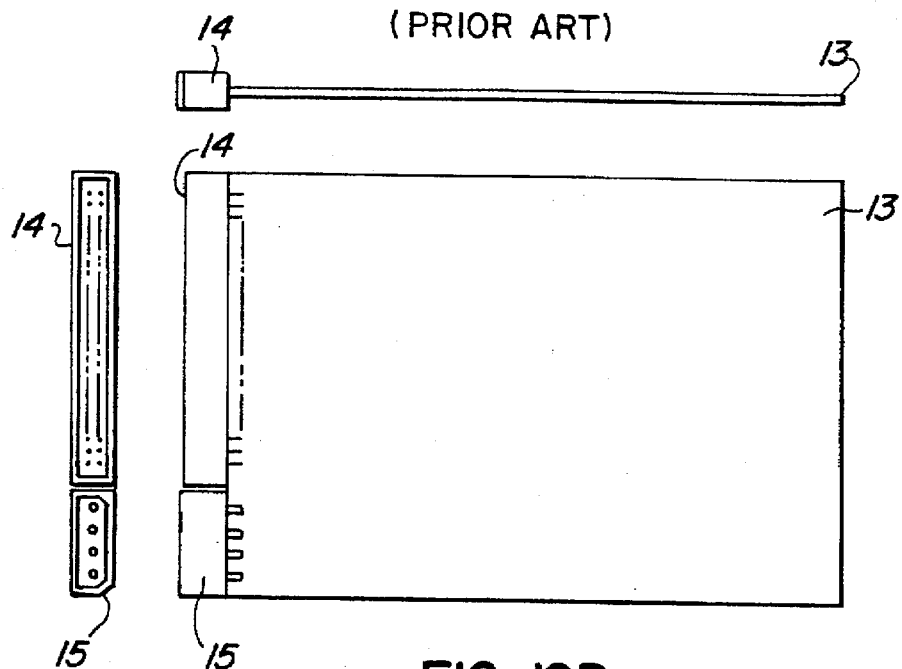

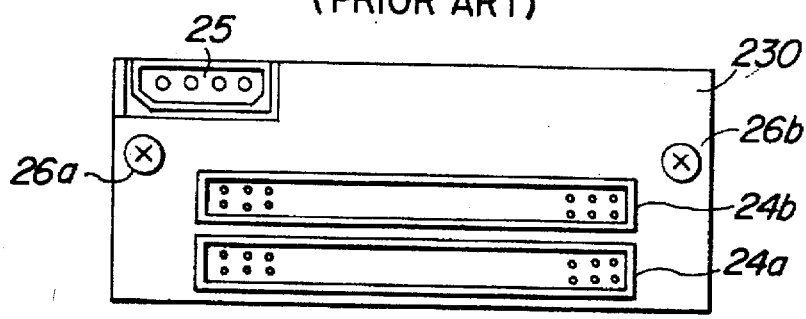
FIG. 11A (PRIOR ART)
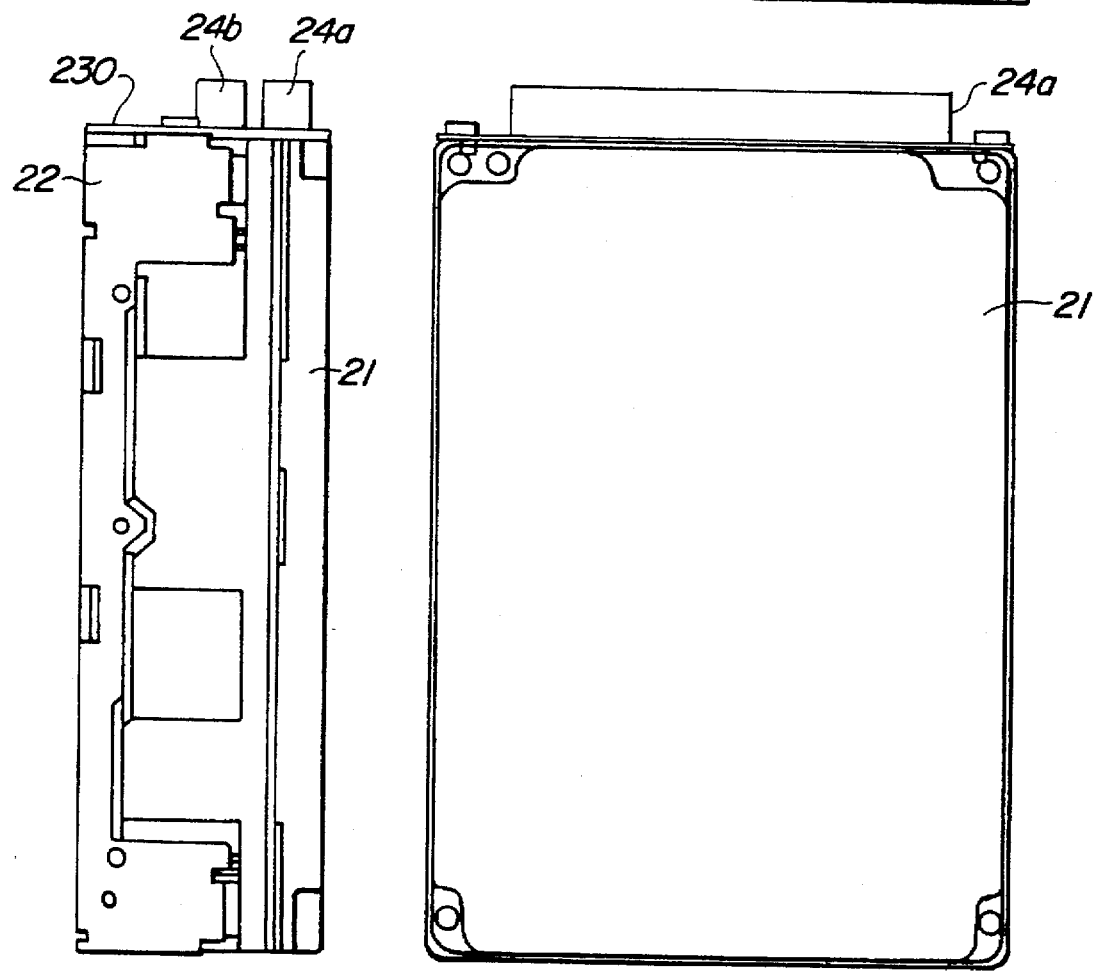
FIG. 11C (PRIOR ART)
FIG. 11B (PRIOR ART)

DISK DRIVE APPARATUS HAVING DUAL I/O CONNECTORS

BACKGROUND OF THE INVENTION

1. Field of the Invention

This invention relates to a storage apparatus such as a magnetic disk drive, an optical disk drive, etc. More particularly, this invention is related to a storage apparatus having dual input/output (I/O) connectors which enable communication with different host computers.

In these years, magnetic disk drives and optical disk drives have increased storage capacity, and must have multiple features. Dual I/O ports is one such multiple feature which improves processing capability and reliability.

In regard to processing capability, when a single port disk drive is used and the single port is used for transfer of data, a command from a host apparatus is not simultaneously transferred. On the other hand, when a dual port disk drive is used and one of the dual ports is only used for transfer of data, a command can still be accepted through the other port. Moreover, the command can be processed immediately depending on the type of command.

With regard to reliability, when the single port of the single port disk drive fails, processing can no longer be continued. On the other hand, in the case of the dual port disk drive, where one of the dual ports of the dual port disk drive fails, processing can be continued with the other port.

2. Description of Related Art

Referring to FIG. 9, a conventional single port 3.5-inch magnetic disk drive will be explained first. FIG. 9 shows an external appearance of the conventional single port type disk drive. FIG. 9(A) is a rear view, FIG. 9(B) is a bottom view, and FIG. 9(C) is a side elevation view of the disk drive.

A disk enclosure 11 contains a magnetic head, a mechanism for moving the magnetic head, a magnetic disk medium and a mechanism for rotating the magnetic disk medium (each not shown). A frame 12 is used to support the disk enclosure 11. The frame 12 is also used to install the disk drive in other apparatus.

A printed circuit board 13 (best seen in FIG. 10) is provided at a top surface of the disk enclosure 11. A plurality of circuits are provided on a surface of the printed circuit board 13. Connectors 14 and 15 are also provided on the printed circuit board 13. The connector 14 is an interface connector mounted on the side edge of one end of the printed circuit board 13. The interface connector 14 is used for transferring and receiving data and commands to and from an external apparatus. The connector 15 is a power connector mounted on the side edge of one end of the printed circuit board 13, side by side with the interface connector 14. The power 10 connector 15 is used for receiving a source voltage from an external apparatus.

FIG. 10 shows an external view of the printed circuit board used in the apparatus shown in FIG. 9. In FIG. 9, the printed circuit board 13 is not illustrated because it is hidden by the disk enclosure 11.

The printed circuit board 13 is approximately the same in size as the top surface of the disk enclosure 11. The printed circuit board 13 is mounted on the disk enclosure 11 by using screws at the top surface of the disk enclosure 11. Moreover, the printed circuit board 13 includes on the side edge at one end thereof, the interface connector 14 and power connector 15. The connecting direction of the connectors 14 and 15 is parallel to a plane of the printed circuit board 13. Moreover, the printed circuit board 13 also has a circuit having a wiring pattern, not illustrated, which performs data transfer.

The external size of the 3.5-inch magnetic disk drive, shown in FIG. 9, may be accommodated within the 3.5-inch form factor (depth: 146 mm, width: 101.6 mm, height: 41.3 mm).

Next, referring to FIG. 11, the conventional dual port type 3.5-inch magnetic disk drive apparatus will be explained. FIG. 11 is an external view of the conventional dual port type disk drive. FIG. 11(A) is a rear view, FIG. 11(B) is a bottom view, and FIG. 11(C) is a side elevation view thereof.

In FIG. 11, the magnetic disk drive apparatus includes a disk enclosure 21, a frame 22, a printed circuit board 230 which has dual ports, interface connectors 24a, 24b, a power connector 25, and screws 26a, 26b for connecting the printed circuit board 230 to the frame 22.

The printed circuit board 230 is needed to mount the interface connectors 24a and 24b. As is apparent from FIG. 10, it is physically impossible to arrange two interface connectors on the side edge of the printed circuit board 13. Therefore, the two interface connectors 24a and 24b are assembled and installed in two stages by using the printed circuit board 230.

FIG. 12 is a perspective view of an essential portion of the conventional dual port disk drive shown in FIG. 11, before loading a dual port type printed circuit board on the frame 22. FIG. 13 is a perspective view of a portion of the conventional dual port type disk drive shown in FIG. 11, after installing the dual port type printed circuit board on the frame 22.

In these figures, the disk drive apparatus includes the disk enclosure 21, the frame 22, a relay connector 241 and the power connector 25, as explained with respect to FIG. 9.

The printed circuit board 230 of a dual port type disk drive apparatus mounts a relay connector 242 to be coupled to the relay connector 241, a first interface connector 24a, a second interface connector 24b and a control circuit.

The control circuit is not illustrated. Moreover, the printed circuit board 230 of the dual port type disk drive apparatus is also provided with mounting holes 231a and 231b. The printed circuit board 230 can be mounted to the mounting holes 221a and 221b in the side of frame 22 by using mounting screws.

There are many parts which are necessary to provide a dual port interface connector to a disk drive apparatus. The many number of parts results in high cost. Thus, there is a need for disk drives having dual port connectors which are easily and efficiently assembled, at reduced cost.

SUMMARY OF THE INVENTION

It is therefore an object of the present invention to provide a disk drive having a novel connector mounting structure with a reduced number of parts in order to realize less cost.

It is another object of the present invention to provide a high performance disk drive having a plurality of ports with a novel connector mounting structure.

It is further an object of the present invention to provide a novel connector mounting structure which enables size reduction.

It is a still further object of the present invention to provide a novel connector mounting structure which can reduce damage to printed circuit boards when a connector is inserted or removed.

Additional objects and advantages of the present invention will be set forth in the description which follows, and, in part, will be clear from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention as embodied and broadly described herein, there is provided a disk drive having a disk enclosure containing at least a reproducing head and a mechanism for moving the reproducing heads. A printed circuit board is provided at one surface of the disk enclosure, the printed circuit board having a circuit controlling transfer of at least reproduced data to an external device, and connectors provided on the printed circuit board for electrical connection with the external device for transfer of reproduced data thereto. The printed circuit board has a projecting portion at one end of the printed circuit board which extends from and beyond the disk enclosures. The connectors are mounted on the projecting portion of the printed circuit board in such a manner that the connecting direction of the connectors orthogonally crosses the plane formed by the printed circuit board.

BRIEF DESCRIPTION OF THE DRAWINGS

The accompanying drawings, which are incorporated in and constitute a part of the specification, illustrate embodiments of the invention and, together with the description, serve to explain the principles of the invention. In the drawings, like numerals refer to like parts throughout.

FIG. 1(A) depicts a rear view; FIG. 1(B) is a bottom plan view, and FIG. 1(C) is a side elevation view of a disk drive made in accordance with the present invention;

FIG. 4(B) is a bottom view and FIG. 4(C) is an edge view of a printed circuit board for the apparatus shown in FIG. 1;

FIG. 5(B) is an end view, and FIG. 5(C) is a side view of a main frame for the apparatus shown in FIG. 1;

FIG. 6(A) shows an end view, FIG. 6(B) shows a side view and FIG. 6(C) shows an end view of an interface connector;

FIG. 6(D) shows an end view, FIG. 6(E) shows a side view and FIG. 6(F) shows an end view of a power connector;

FIG. 7(A) shows a side view and FIG. 7(B) shows an end view of the sub-frame shown in FIG. 1;

FIG. 7(C) shows a side view and FIG. 7(D) shows an end view of an alternate embodiment of the sub-frame shown in FIG. 7(A) and FIG. 7(B);

FIG. 8(A) shows one embodiment of a printed circuit board in the sub-frame shown in FIG. 7(B);

FIG. 8(B) shows an alternate embodiment of the printed circuit board of 8(A) in the sub-frame of FIG. 8(B);

FIG. 10(A) is a side view, FIG. 10(B) is a bottom view and FIG. 10(C) is an edge view of a printed circuit board used in the enclosure shown in FIG. 9;

FIG. 11(A) is an end view, FIG. 11(B) is a bottom view and FIG. 11(C) is a side view of a prior art dual port type disk drive;

DETAILED DESCRIPTION OF THE PREFERRED EMBODIMENTS

Figure 2:
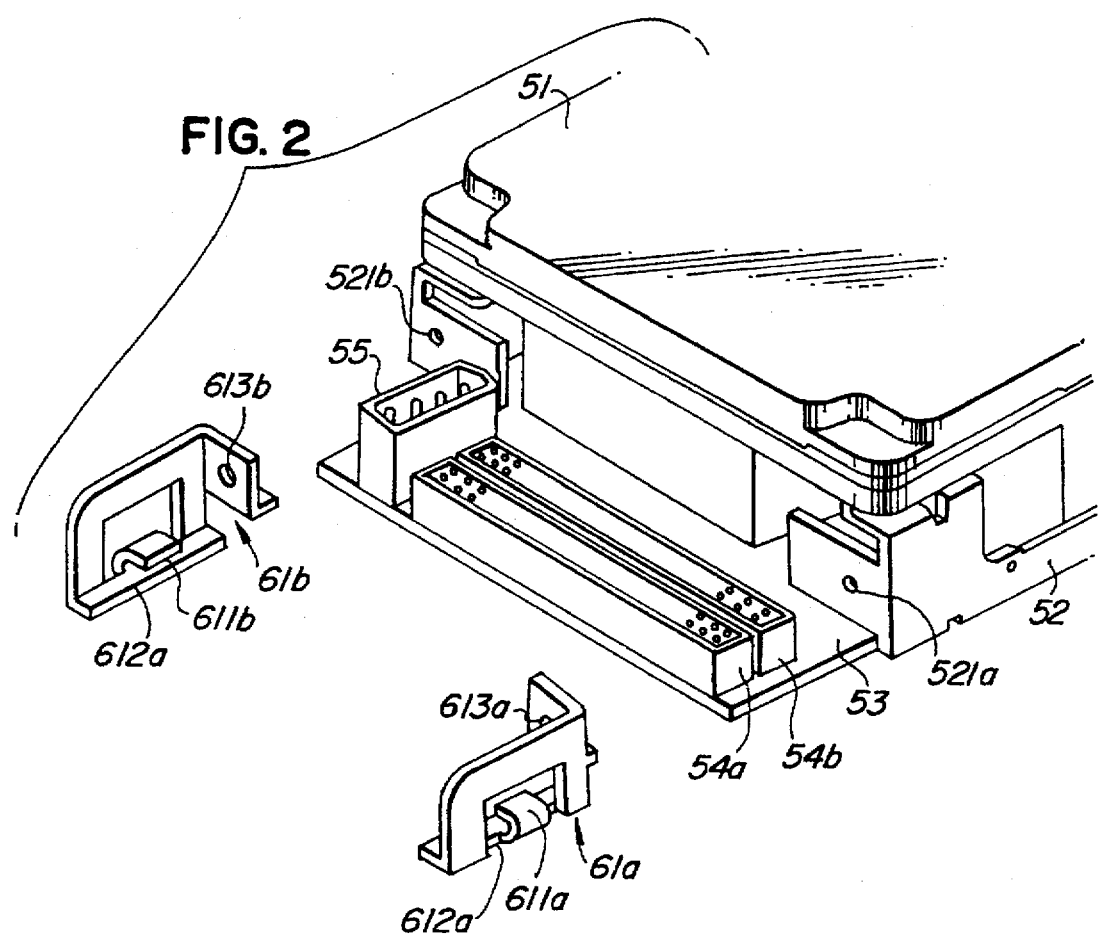
FIG. 2 is a perspective view of a portion of the disk drive shown in FIG. 1, before loading of a protection frame.

Reference will now be made in detail to the present preferred embodiment of the invention, examples of which are illustrated in the accompanying drawings.

(1) Structure Of Disk Drive

Referring to FIG. 1, a structure of a dual port type 3.5-inch disk drive apparatus as an embodiment of the present invention will be explained.

In FIG. 1, a disk enclosure 51 encloses a magnetic head for recording and reproducing data, a mechanism for moving the magnetic head, a magnetic disk medium for storing data and a mechanism for rotating the magnetic disk medium (each not shown). A main frame 52 supports the disk enclosure 51. The main frame 52 is used to mount the disk drive to other apparatus. A printed circuit board 53 may be mounted by using screws on the bottom surface of the disk enclosure 51.

Interface connectors 54a and 54b are used to transmit data or commands to an external apparatus, not shown in FIG. 1. These interface connectors 54a and 54b are also used to receive data or commands from the external apparatus. A power connector 55 receives power source voltage from an external circuit. Three connectors 54a, 54b and 55 are mounted on a surface of the printed circuit board 53 on a portion of the printed circuit board 53 which projects from the disk enclosure 51. The connectors orthogonally cross the plane formed by the printed circuit board 53.

Sub-frames 61a and 61b are mounted on the main frame 61 to support the part of the printed circuit board 53 which projects from the disk enclosure 51.

This disk drive has the sizes of 171.4 mm in depth, 101.6 mm in width and 41.3 mm in height. Therefore, the width and height are within the sizes of the 3.5-inch form factor. The size in depth is not covered within the 3.5-inch form factor because the printed circuit board 53 projects from the disk enclosure 53. This type of dual port type disk drive may be used within a locker. The locker contains a plurality of dual port type disk drives with a large scale or an intermediate scale computer system, so size constraints on the drive are rather flexible. For example, the dual port type disk drive may be used in an array disk drive. A housing of the array disk drive well known in the art contains and mounts a plurality of the dual port type disk drives. The housing further mounts a plurality of controllers. The first one of the controllers communicates data or commands with a first host computer, and the second one of the controllers communicates data or commands with a second host computer. The first and second controllers communicate with the dual port type disk drive. The first controller is connected to a first port of the dual port type disk drive through a cable and a connector and the second controller is connected to a second port of the dual port type disk drive through a cable and a connector. Furthermore, the first controller and the second controller may be constructed to communicate data and commands between each other. In this structure, if either the first controller or the second controller fail, the dual port type disk drive could be accessed by both the first and second host computer. The dual access from both the first and second host computer to a disk drive apparatus is established by using the dual port type disk drive as well as a disk drive having a single interface port which is connectable to both the first and second host computer.

(2) Assembly Of Disk Drive

Figure 3:
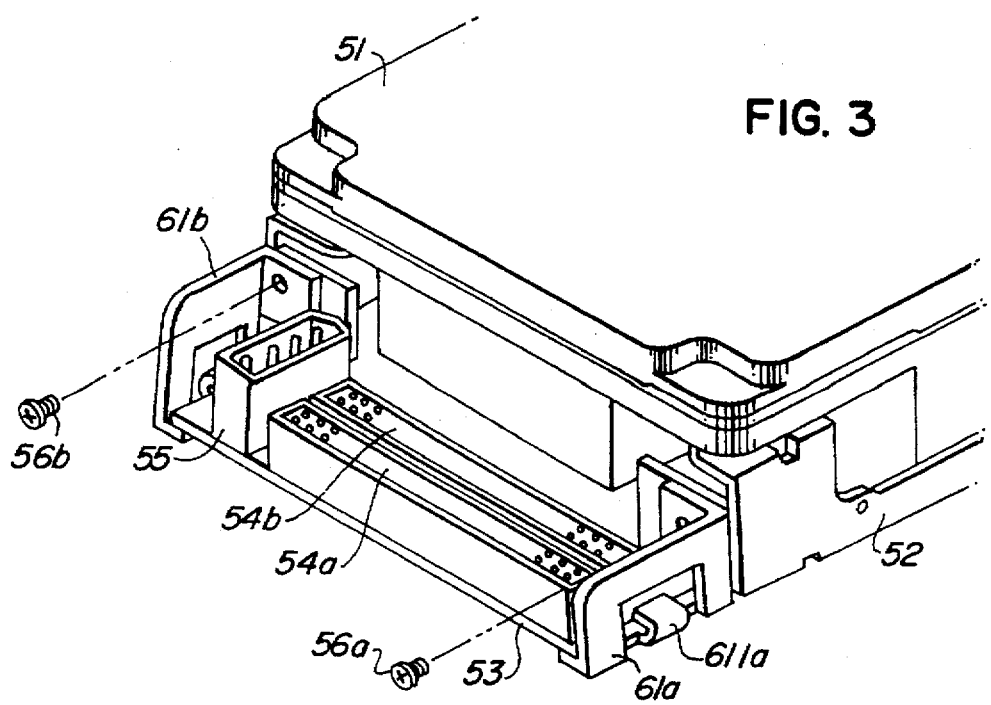
FIG. 3 is a perspective view of the portion of the disk drive shown in FIG. 1, after loading of the protection frame.

Referring to FIG. 2 and FIG. 3, assembly of the disk drive of this embodiment will be explained.

First, after the disk enclosure 51 is assembled, the main frame 52 is fixed to the disk enclosure 51 by threading screws through a vibration-proof material. Next, the printed circuit board 53 is fixed with screws to the bottom surface of the disk enclosure 51.

Finally, the sub-frames 61a and 61b are mounted on the main frame 52 in such a manner as to support a part of the printed circuit board 53 with the supporting portions 611a and 611b thereof. The sub-frame 61a is fixed through a mounting hole 613a thereof and a threaded hole 521a in the side of frame 52 by using a screw 56a. In the same manner, the sub-frame 61b is fixed through a mounting hole 613b thereof and a threaded hole 521b in the side of frame 52 by using a screw 56b.

(3) Structure Of The Printed Circuit Board

Figure 4A:
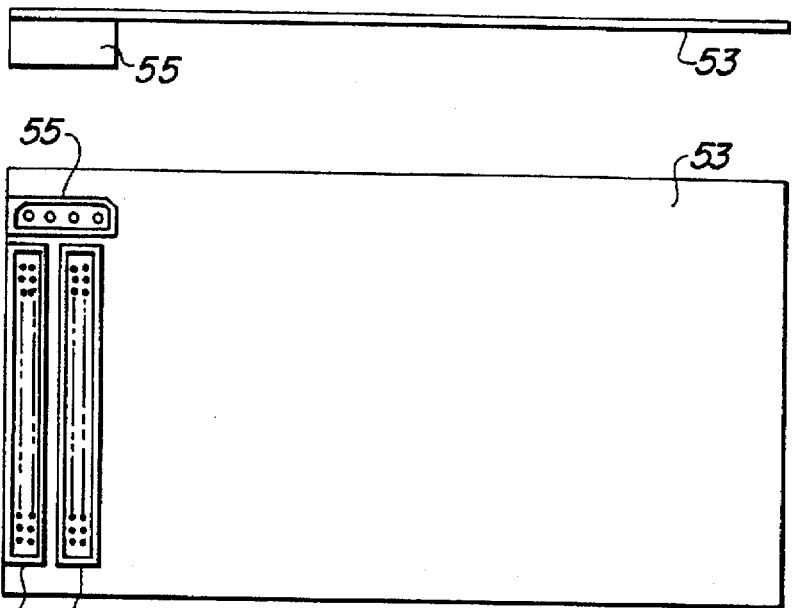
FIG. 4(A) is a side view.

A structure of the printed circuit board 53 is explained with reference to FIG. 4. The printed circuit board 53 can have a depth of 168.3 mm and width of 95.4 mm. The depth of the printed circuit board 53 is longer than that of the disk enclosure 51. One end of the printed circuit board 53 in the depth direction projects from the disk enclosure 51.

The printed circuit board 53 mounts on the end surface projected from the disk enclosure 51, the first interface connector 54a, the second interface connector 54b and the power connector 55. Additionally, the printed circuit board 53 includes on one or both of its surfaces at least a microprocessor and a variety of control circuits.

The interface connectors 54a and 54b are arranged adjacent to each other in such a manner that the longitudinal direction of the connectors is parallel to the width of the printed circuit board. Moreover, since the length of the interface connectors 54a and 54b in the longitudinal direction is shorter than the width of the printed circuit board 53, when one end on the longitudinal direction is aligned with one end in the width direction of the printed circuit board 53, a vacant space is reserved on the other side of the printed circuit board. The power connector 55 can be placed in that vacant space.

(4) Structure Of The Main Frame

Figure 5A:
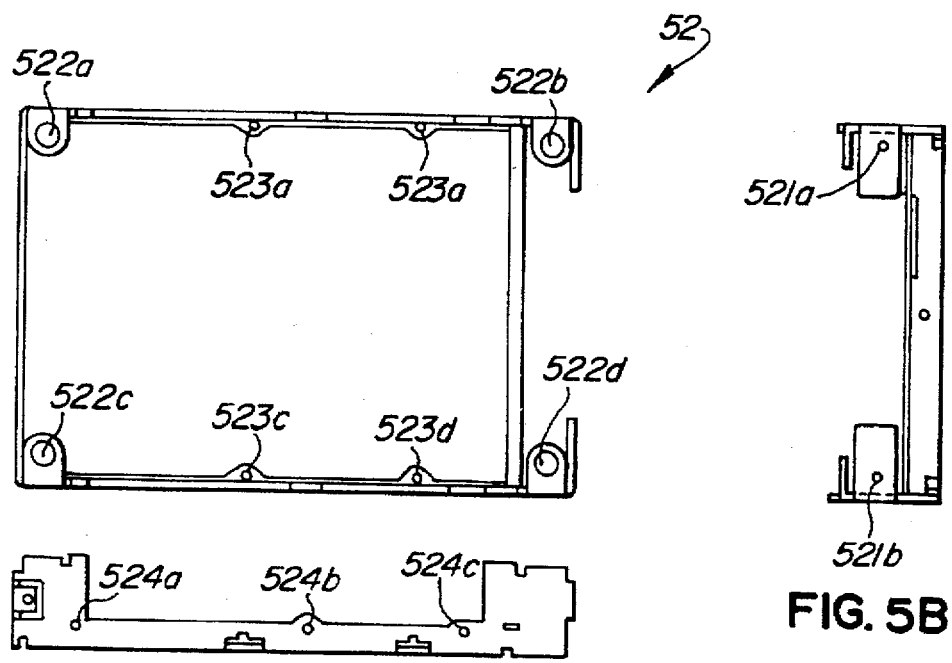
FIG. 5(A) is top view.
Figure 9A:
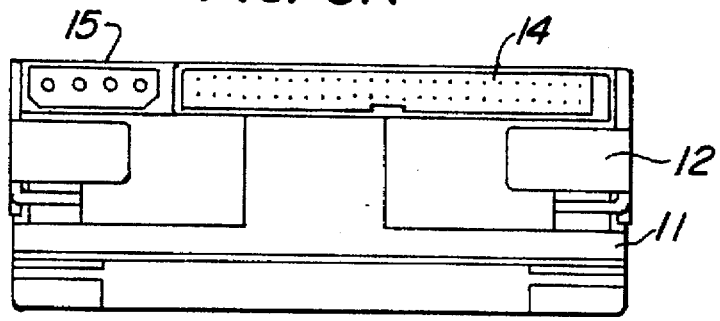
FIG. 9(A) depicts a rear view, FIG. 9(B) a bottom view, and FIG. 9(C) a side view of a prior art single port type disk drive.
Figure 9C:
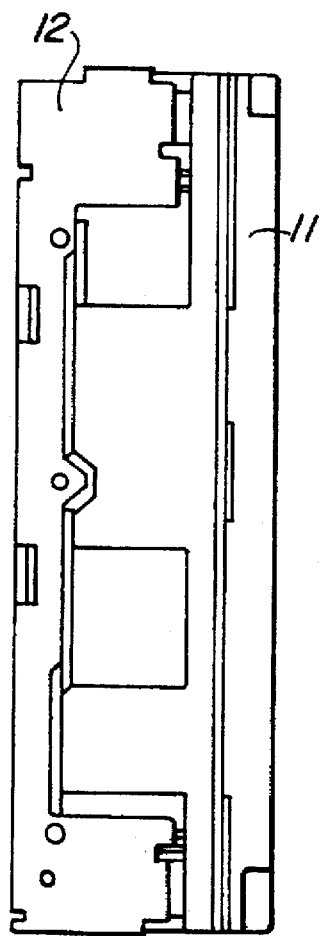
Figure 9B:
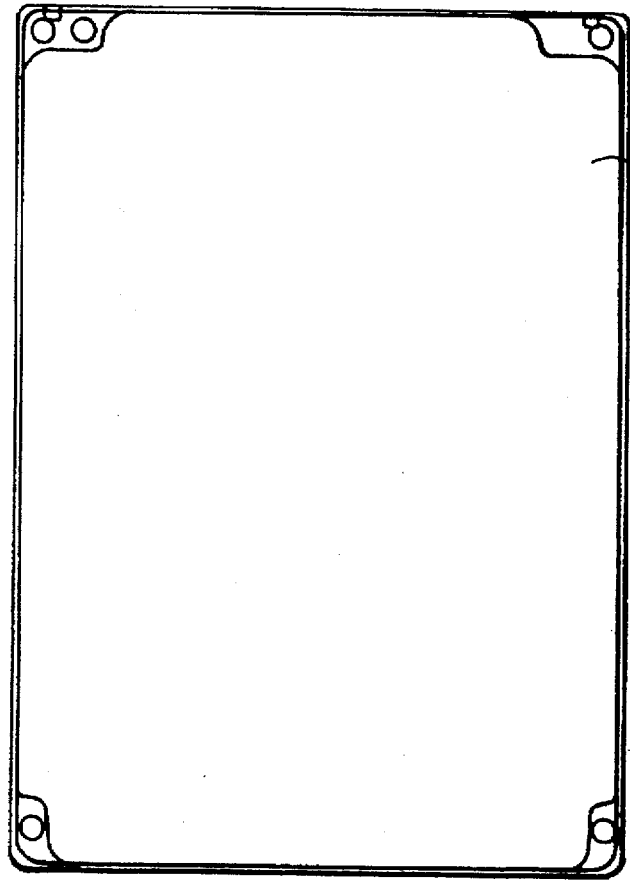
Figure 12:
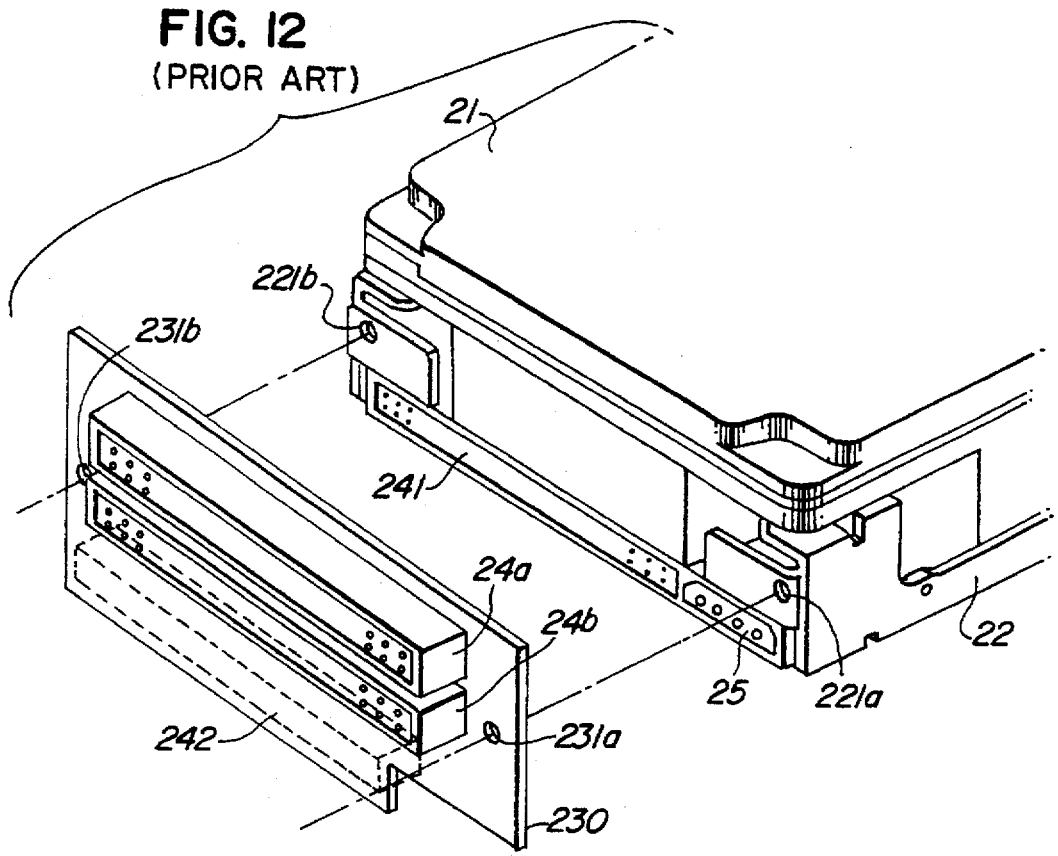
FIG. 12 is a perspective view of a portion of the prior art dual port type disk drive shown in FIG. 11, before loading of a dual port type printed circuit board.
Figure 13:
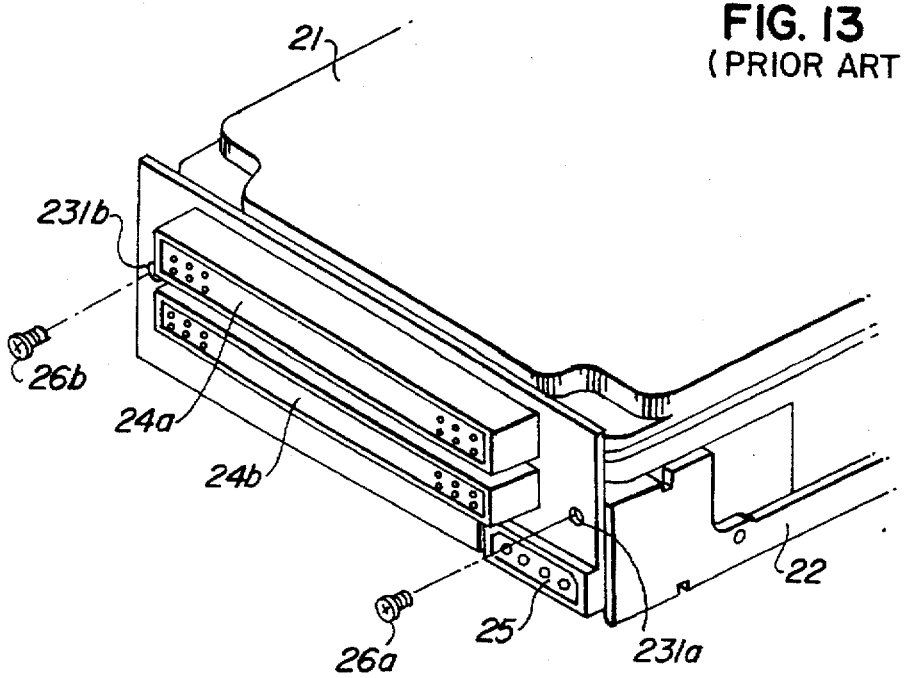
FIG. 13 is a perspective view of the portion of the prior art dual port type disk drive shown in FIG. 11, after loading of the dual port type printed circuit board.

Referring to FIG. 5, a structure of the main frame 52 is explained.

In FIG. 5, threaded holes 521a and 521b are used for mounting the sub-frames. Mounting holes 522a to 522d are used for mounting the disk enclosure 51 to which vibration-proof rubber materials are applied. Therefore, the disk enclosure 51 is mounted to the main frame 52 through these vibration-proof rubber materials.

Mounting holes 523a to 523d are used for mounting the main frame 52 to an external apparatus such as a locker or a case, etc. Mounting holes 524a to 524c (including a mounting hole in the opposite side of the frame not illustrated) are used for mounting the main frame 52 to an external apparatus such as a locker or a case, etc. The mounting holes 523a to 523d or mounting holes 524a to 524c, with corresponding holes on the other side of the frame 52, are used depending on the mounting direction of the main frame 52.

(5) Structure Of The Connector

Referring to FIG. 6, a structure of the interface and power connectors will be explained.

In FIGS. 6(A), 6(B) and 6(C), a housing 541 contains the interface connector 54. The interface connector 54 has a plurality of signal pins 542 formed of 50 pins. The interface connector 54 may be a connector for the standard SCSI interface. The external size of the housing 541 measures 71 mm in length in the longitudinal direction, and 8.5 mm in length in the short side direction, with a height of 9.2 mm. The interface connector 541 may, of course, be replaced with connectors conforming to other specifications.

A housing 551 contains the power connector 55, shown in FIGS. 6(D), 6(E), and 6(F). A power supply pin 552 may be formed of 4 pins. The external size of the housing 552 of the power connector 55 measures 23.3 mm in length in the longitudinal direction, and 8.15 mm in length in the short side direction, with a height of 10.2 mm.

(6) Structure Of The Auxiliary Frame

Referring to FIG. 7, two embodiments of the sub-frame will now be explained.

The sub-frame 61a (FIGS. 7A and 7B) supports a part of the printed circuit board 53 with the supporting portions 611a and 612a. The supporting portion 611a is bent within a cutout portion 614a to form a U-shape element in combination with the supporting portion 612a. Moreover, the mounting hole 613a is used for mounting the sub-frame 61a to the main frame 52.

In this embodiment, the main frame 52 and the sub-frames 61a and 61b are formed as different elements, but these may also be formed as an integrated element. When these are formed as individual elements as in this embodiment, the main frames 52 can have the same design for both single port and dual port type disk drives, which results in a cost reduction.

Meanwhile, the sub-frame 62 shown in FIGS. 7(A) and 7(B) indicates the alternate embodiment and also supports the printed circuit board with the U-shape supporting portions 621 and 622. Moreover, the sub-frame 62 has a plurality of mounting holes 623 and 624 and therefore does not rotate while being fixed with screws or even when an external force is applied thereto.

FIG. 8(A) illustrates a sub-frame 63 in yet another alternate embodiment. In FIG. 8(A), the sub-frame 63 has an elastic material 633 provided in the deepest area of the U-shape supporting portions 631 and 632 to absorb vibration or shock which is generated while the connector applied to the printed circuit board 53 is inserted or removed.

In FIG. 8(B), a sub-frame 64 has an elastic material 643 as a lining of the U-shape supporting portions 641 and 642, to absorb vibration or shock which is generated while the connector is inserted or removed.

(7) Application Of The Present Invention

The present invention has various applications in addition to the dual port type 3.5-inch magnetic disk drive explained above.

This invention can be applied to the dual port system, as well as a single port system. This invention is also applicable to a disk drive apparatus which has more than two interface ports. Moreover, this invention may be used in many types of storage devices, e.g., a magnetic disk cartridge disk drive for which a magnetic disk medium can be exchanged as a cartridge, a magneto-optical disk drive, CD-ROM drive, magnetic tape drive, an IC card device, and a semiconductor disk drive for which a plurality of semiconductor memories are used to emulate a magnetic disk drive.

According to the present invention, since one or more connectors can be mounted on the main printed circuit board without requiring a separate printed circuit board for mounting connectors and the corresponding relay connector required to connect the main printed circuit board to the printed circuit board for mounting the connectors, the number of elements are reduced which in turn reduces costs.

Furthermore, in this invention, the printed circuit board is mounted near one side of the disk enclosure (FIG. 1), and the connectors are secured on the surface of the printed circuit board which faces the other side of the disk enclosure so the overall height of the disk drive is not increased and a spacious area for mounting the connectors is not required. This in turn means that the external size of the disk drive including the connectors, the disk enclosure, and the printed circuit board can be smaller than if the connectors were mounted on the opposite surface of the printed circuit board.

Moreover, in this invention, a plurality of connectors can be mounted, and a multi-port type high performance disk drive can be realized. The plurality of connectors can be mounted in the manner described by further extending the part of the printed circuit board which projects from the disk enclosure, and thus high performance by a plurality of ports can be ensured.

Further, even when a plurality of connectors are to be mounted, these connectors can be mounted very effectively and the disk drive apparatus can be reduced in size. Where these connectors are arranged in line, these connectors can be mounted efficiently. Furthermore, where the connectors are arranged in line so that the longitudinal direction is in the width direction of the printed circuit board and the short side direction is in the extending direction of the printed circuit board, as in FIG. 1, the length of the printed circuit board projection from the disk enclosure may be determined by multiplying the length in the short side direction of the connectors by the number of connectors, thus enabling the optimum mounting of connectors depending on the number of connectors.

Furthermore, since the length of the connectors in the longitudinal direction is shorter than the width of the printed circuit board, when the connectors are arranged in line in such a manner that the longitudinal direction of the connector matches the width direction of the printed circuit board, a space can be reserved in the printed circuit board for a power connector to be mounted therein, thus realizing a reduction in the size of the disk drive.

Further, the frame supports the part of the printed circuit board which projects from the disk enclosure, so the printed circuit board can be isolated from vibration or shock which is generated while the connector is inserted or removed. Where the frame supports the printed circuit board through the elastic material, damage of the printed circuit board can further be prevented.

Furthermore, the same main frame can be used in both single port and dual port type disk drives by forming the main frame and sub-frame with different elements, thus further reducing costs.

What is claimed is:

1. A disk drive comprising:

a disk enclosure containing at least a reproducing head and a mechanism for moving the reproducing head;

a printed circuit board having circuitry located in the enclosure, said printed circuit board having a circuit controlling transfer of at least reproduced data to an external device, a portion of said printed circuit board extending outside of said enclosure; and a pair of connectors, each said connector having a longitudinal direction, said connectors being secured to said outside portion of said printed circuit board such that said longitudinal direction of each said connector is mutually parallel, said longitudinal direction orthogonally crossing said printed circuit board.

2. The apparatus of claim 1 comprising means secured to said enclosure for supporting said outside portion of said printed circuit board.

3. The apparatus of claim 2 comprising an elastic material secured to said supporting means adjacent to said outside portion of said printed circuit board for absorbing shock which is generated when a mating connector is attached to said connector.

4. The apparatus of claim 1 comprising at least one support secured to said enclosure and said outside portion of said printed circuit board.

5. The apparatus of claim 4 comprising an elastic material secured to said support adjacent to said outside portion of said printed circuit board.

6. The apparatus of claim 4 comprising two of said supports.

7. The apparatus of claim 1 wherein the apparatus is a disk drive having at least a reproducing head inside of said enclosure, and a mechanism inside said enclosure for moving said head, said reproducing head producing reproduced data, said printed circuit board having a first circuit which controls the transfer of reproduced data to one of said connectors, and a second circuit for transferring reproduced data to the other of said connectors.

8. The apparatus of claim 1 wherein the apparatus is a disk drive having at least a reproducing head inside of said enclosure, and a mechanism inside said enclosure for moving said head, said reproducing head producing reproduced data, said printed circuit board having a circuit which controls the transfer of reproduced data to said connector, for transfer to an external device.

9. The apparatus of claim 1 wherein the apparatus is an optical drive.

* * * * *